Fig. 14

United States Patent Office 3,232,382
Patented Feb. 1, 1966

3,232,382
WORKMAN HOISTING MACHINE
Stewart Theodore Buck, % Buck Equipment Corp., 720 Anderson Ferry Road, Cincinnati, Ohio
Filed Feb. 24, 1964, Ser. No. 346,732
5 Claims. (Cl. 187—89)

This invention relates to hoisting machines and has to do more particularly with a portable, self-erecting tower structure equipped with elevator mechanism for raising and lowering workmen, equipment and materials on all types of construction and maintenance projects.

Portable elevator towers of the general type to which the instant invention relates are taught in Buck Patents 2,653,685 and 2,990,034 wherein there is disclosed a portable self-erecting tower structure equipped with a lift platform adapted to travel along the tower so as to raise equipment and material on the job site. While such tower structures are in widespread use, their utility has been limited in that they have not been approved for use by workmen and other personnel. The safety standards which must be met where workmen are being carried are far higher than those required where only material and equipment is being handled.

The instant invention has for its principal object the provision of an improved hoisting machine which embodies improved operating mechanism and safety features which render such device wholly suitable for use by workmen and other personnel.

A further object of the instant invention is the provision of a hoisting machine of the character described which incorporates a dual acting locking device for the hoisting cab, such device acting to lock the cab to the tower in the event that either or both of the two hoisting cables should break or in the event that the cab should over-accelerate during its downward movement.

Still another object of the invention is the provision of additional safety mechanism operative to arrest movement of the cable winch in the event that either or both of the cab supporting cables should break or become slack during operation of the device.

Still another object of the invention is the provision of safety mechanism operative to effectively brake the cable winch in the event it should overspeed during descending movement of the cab, thereby effectively stopping the movement of the cab in the event such overspeeding should occur.

Still a further object of the instant invention is the provision of a hoisting machine of the character described embodying a plurality of coacting yet independently operable safety devices which compliment each other in that should one device fail another is available to perform the intended function of the device which failed to operate, thereby affording maximum protection to persons riding in the cab.

The foregoing together with other objects of the invention which will appear hereinafter or which will be apparent to the skilled worker in the art upon reading this specification, are accomplished by that construction and arrangement of parts of which an exemplary embodiment shall now be described.

Reference is now made to the accompanying drawings wherein.

Figures 1, 2, 3:
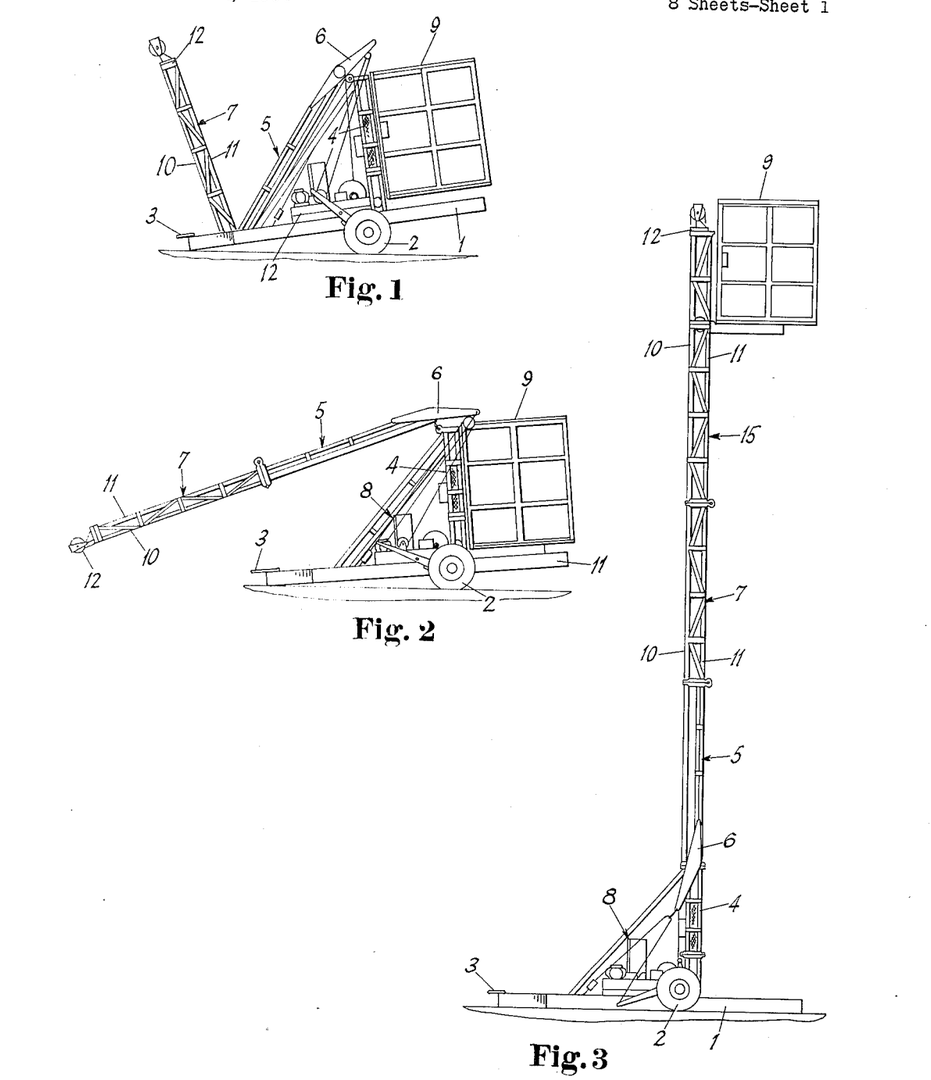
FIGURE 1 is a side elevational view of a hoisting machine in accordance with the instant invention in the collapsed or traveling position.
FIGURE 2 is a side elevational view illustrating the hoisting machine with the tower in partly erected condition.
FIGURE 3 is a side elevational view illustrating the hoisting machine in the fully erected position.

Referring first to FIGURE 1 of the drawings, I have therein illustrated a hoisting machine in accordance with the instant invention as it appears in its collapsed position in which the device may be transported from place to place. Essentially, the device comprises a main frame 1 mounted on pneumatic tires 2 which automatically retract as the tower structure is raised. Hitch means 3 are provided by means of which the device may be coupled to a vehicle for movement from place to place. The tower structure is composed of a base section 4 secured to the main frame 1, a first folding section 5 pivotally connected to the base section 4 and mounting a pair of lever arms—one of which is indicated at 6—by means of which the tower structure is raised. A second folding section 7 is pivotally connected to the section 5 so as to be automatically extended upon the erection of the tower structure. The tower is erected by means of cables and blocks, the cables being connected to a winch forming a part of the operating mechanism mounted on the main frame 1 and indicated generally at 8.

FIGURE 2 illustrates an intermediate stage in the erection of the tower wherein the levers 6 have been pivoted so as to bring the tower sections 5 and 7 into alignment. At the same time, the pneumatic wheels 2 begin to retract. In this connection, the tower erecting mechanism is interconnected with the wheel retracting mechanism so that the weight of the device is utilized to assist in the erection of the tower. The fully erected condition of the tower is illustrated in FIGURE 3; and it will be noted that the wheels 2 have been fully retracted so that the main frame 1 provides a ground contacting support for the entire device. For details as to the construction of the tower and its mode of erection, reference is made to Buck Patent 2,653,685 wherein such details are set forth.

An elevator cab 9 is adapted to traverse the length of the tower, the opposite sides of the tower being composed of spaced apart pairs of tubular members 10 and 11 which define tracks along which the cab is caused to move. The cab is raised and lowered by means of a set of cables also controlled from a winch forming a part of the operating mechanism 8, the cables extending upwardly around the crown assembly 12 at the top of the tower and thence downwardly for attachment to the cab in a manner which will be explained more fully hereinafter.

Figure 4:
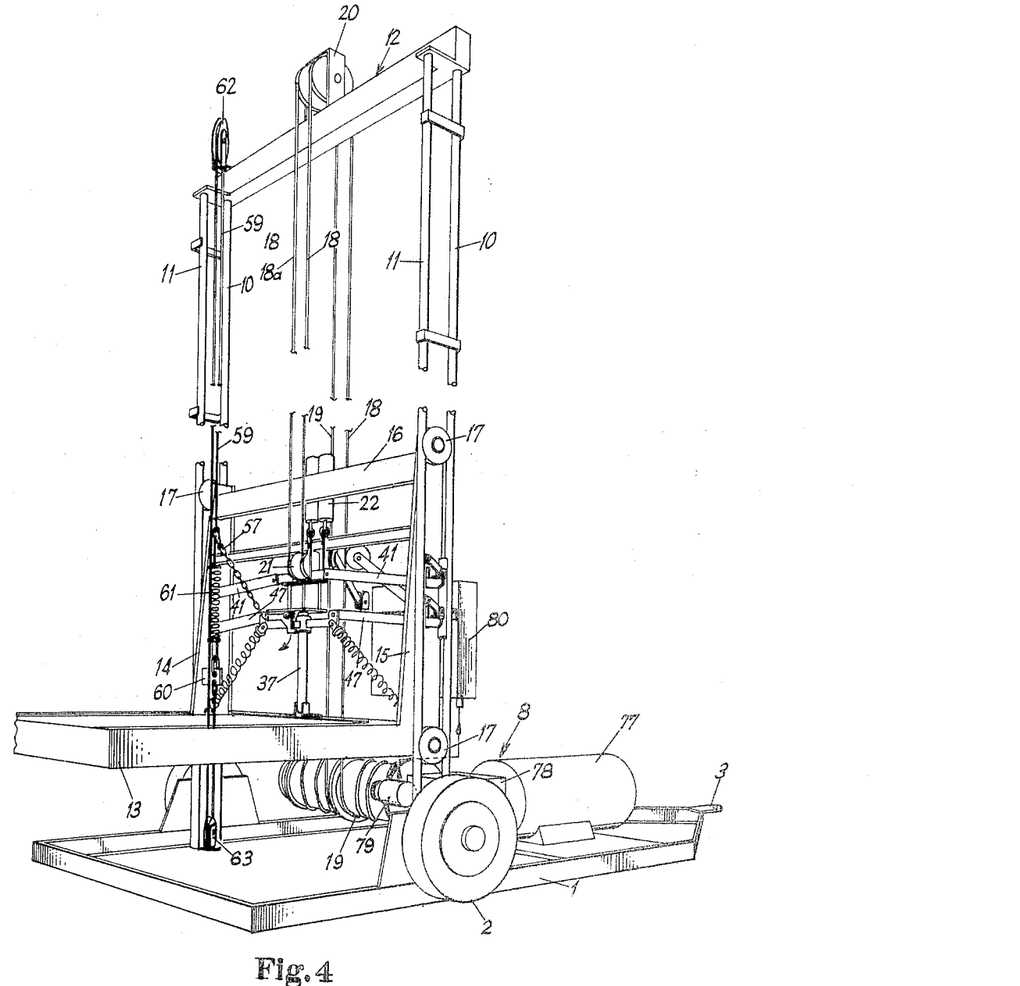
FIGURE 4 is a perspective view with parts broken away illustrating the basic structural elements of the hoisting machine.

With the general organization of the device now in mind, reference is next made to FIGURE 4 of the drawings wherein nonessential parts have been removed so as to illustrate the basic operating components of the device. Thus, the elevator cab comprises a base platform 13 mounting an upwardly extending pair of vertical side members 14 and 15 joined together at their upper ends by a cross beam 16, these elements defining a base frame for the elevator cab. Guide rollers 17 are mounted at the upper and lower ends of the side members 14, 15 which are adapted to travel along the tracks defined by the spaced apart pairs of tubular members 10, 11. The cab frame is raised and lowered by means of cables 18 and 18a which are wound on a two-part cable winch 19, the cables extending upwardly over the crown assembly 12 where they pass around a pair of sheaves 20 and then downwardly to the cab frame where they pass around a pair of sheaves 21 operatively connected to the cab frame in a manner to be described more fully hereinafter, the ends of the cables being secured to the cab frame by means of mounting members 22 which are spring loaded to equalize the load on the cables. This arrangement can be best seen in FIGURE 5 wherein the ends of the cables 18 and 18a are engaged by a pair of cable clamps 23 pivotally connected to the spring loaded arms 22a forming a part of the mounting member 22. It will be evident that the cab frame is suspended on the cables and that should the cables break or become slack while the cab is in an elevated position, the cab would be free to fall. However, mechanism is provided to prevent the cab from falling either in the event the cables should break or in the event that the cab should exceed a predetermined speed during its descent due either to cable breakage or slack.

Figures 5, 8:
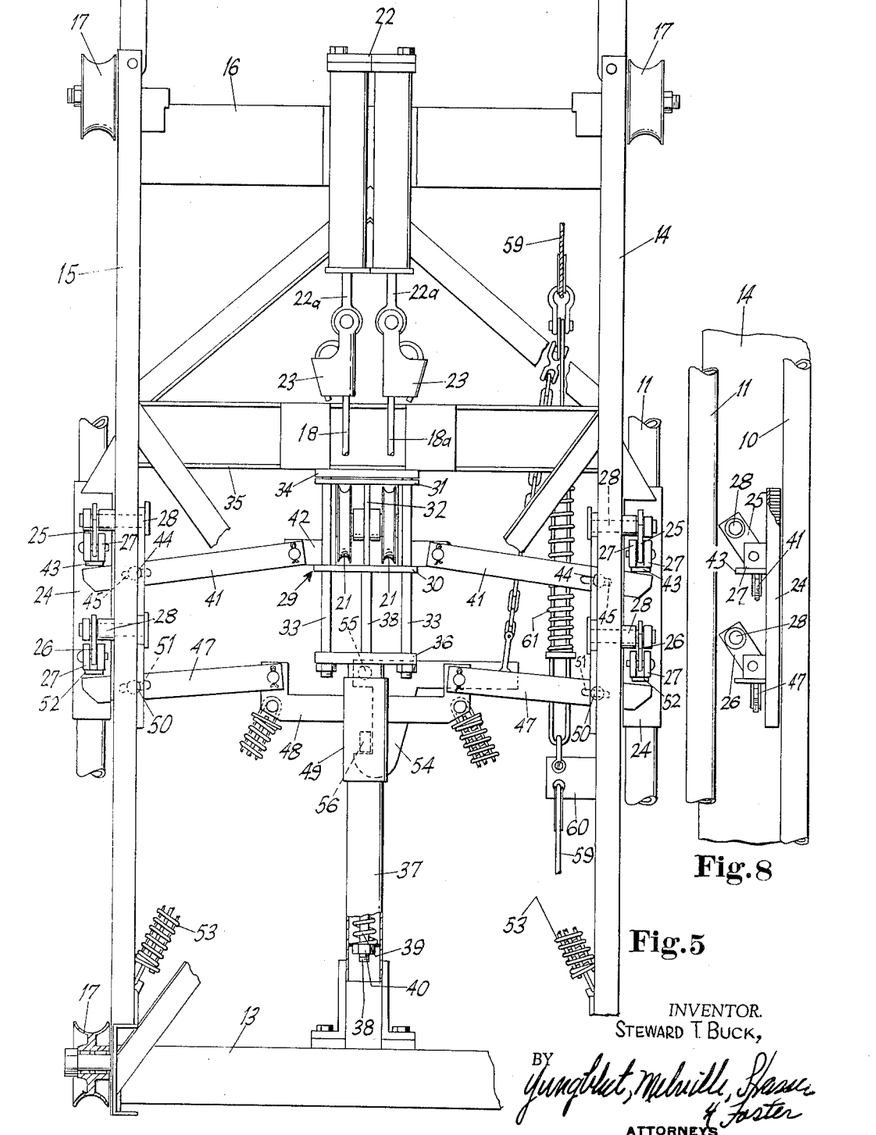
FIGURE 5 is an enlarged fragmentary elevational view illustrating the elevator cab frame and associated safety mechanism.
FIGURE 8 is a vertical sectional view taken along the line 8—8 of FIGURE 5.
Figure 6:
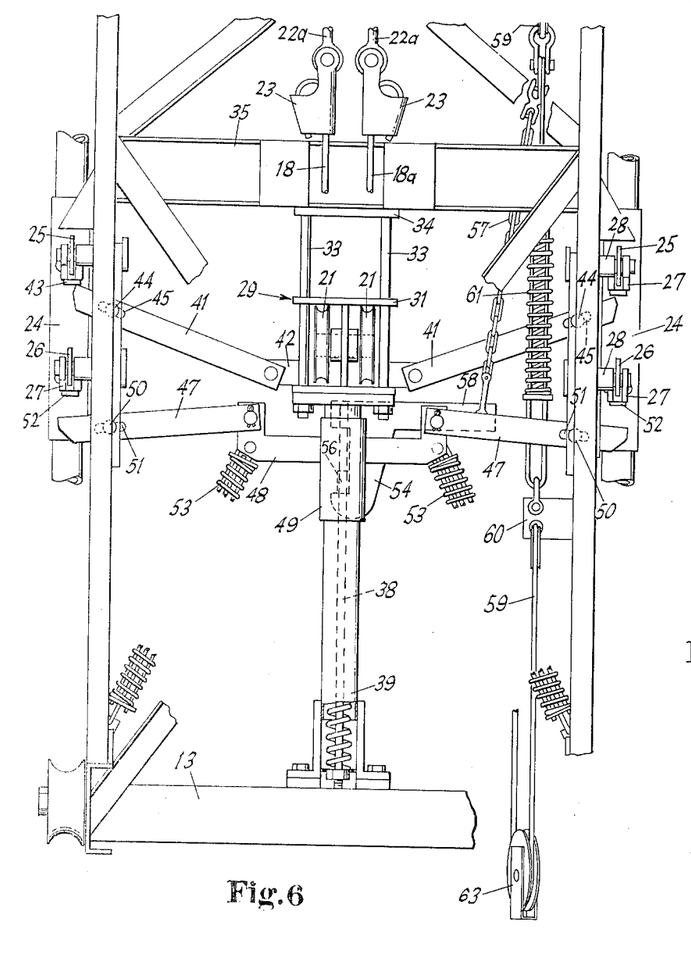
FIGURE 6 is an enlarged fragmentary elevational view similar to FIGURE 5 illustrating the actuation of one of the safety devices.
Figure 9:
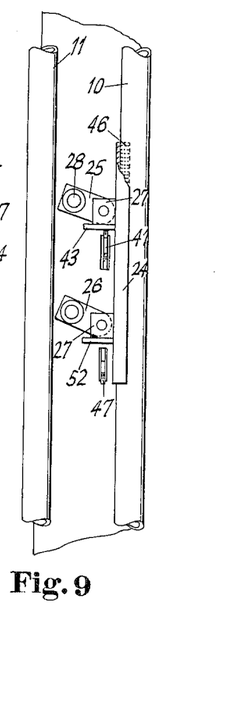
FIGURE 9 is a vertical sectional view taken along the line 9—9 of FIGURE 6.

Referring still to FIGURE 5, each of the side members 14, 15 of the cab frame mounts an elongated brake shoe 24 pivotally secured to the side members by means of pairs of upper and lower parallel links 25 and 26, respectively. The pairs of links 25 and 26 are pivotally connected to the brake shoes by means of mounting ears 27, and to the side members 14, 15 by means of pivot shafts 28. The brake shoes are adapted to pivot from a normal, inoperative position, as shown in FIGURES 5 and 8, in which the shoes lie in spaced relationship to the tubular tower members 10, to the operative position illustrated in FIGURES 6 and 9 in which the shoes are in positive locking engagement with the tubular members 10. The shifting of the brake shoes from the inoperative to the operative position is effected by the mechanism now to be described.

Referring again to FIGURE 5, it will be noted that the sheaves 21 about which the cab suspending cables 18 and 18a pass are mounted in a cage 29 composed of a base plate 30 and a top plate 31 joined together by a vertical support 32. The cage just described, including the sheaves 21, is vertically movable on rods 33 which are secured at their upper ends to a plate 34 secured to the undersurface of a cross beam 35. At their lower ends the rods are secured to a platform 36 fixedly secured to the tubular column 37 which at its lowermost end is anchored to the base platform 13 of the cab frame. The cage 29 is thus free to move vertically along the rods 33 between the plate 34 and the platform 36. A shaft 38 projects downwardly from the base plate of the cage 29 through the platform 36 and into the tubular column 37 where it is surrounded by a helical spring 39 which is compressed between the platform 36 and the free end of the shaft 38 by means of an adjustment nut 40. The spring 39 thus acts to urge the rod 38 downwardly and hence bias the cage 29 toward its lowermost position. Normally, however, the cage is maintained in its uppermost position by reason of the cables 18 and 18a which are supporting the weight load of the elevator cab and its contents.

A pair of actuator arms 41 project outwardly from the opposite sides of the cage, being pivotally connected at their inner ends to a bar 42 mounted on the cage. The actuator arms project outwardly beyond the side members 14, 15 of the cab frame where they underlie abutments 43 projecting rearwardly from the brake shoes 24 immediately beneath the ears 27. The arms 41 are pivotally connected to the side members 14, 15 by means of pins 44 engageable in slots 45 in the arms. When the cage is in its uppermost position, i.e., when the elevator cab is supported by the cables 18 and 18a, the parts assume the condition illustrated in FIGURES 5 and 8 wherein the outer ends of the actuator arms underlie the abutments 43 and the brake shoes are in their inoperative position. If, however, the cables should break or become slack, thereby effectively releasing the cage for downward movement under the influence of the spring 39, the parts will assume the position illustrated in FIGURES 6 and 9, wherein it will be seen that the actuator arms will have been pivoted so as to force their outermost ends upwardly against the abutments 43, thereby forcing the brake shoes into tight engagement with the column 10. In this connection, it will be noted that the innermost surfaces of the brake shoes will be serrated, as at 46, thereby providing a surface which will bite into the tubular members 10 upon contact therewith. It should thus be apparent that the brake shoes will be actuated to lock the cab to the tower immediately upon release of pressure on the cables due either to breakage or slack.

Figure 10:
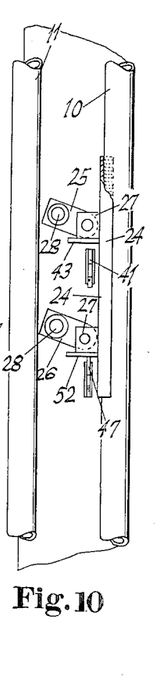
FIGURE 10 is a vertical sectional view taken along the line 10—10 of FIGURE 7.

The brake shoes will also function to lock the cab to the tower in the event that an excessive speed is attained during downward movement of the cab. To this end, the cab structure is provided with a second pair of actuator arms 47 pivotally connected at their inner ends to a bracket 48 fixedly secured to a sleeve 49 which surrounds the column 38 and is movable relative thereto. Toward their outer ends the actuator arms 47 are pivotally connected to the frame members 14 and 15 by pins 50 engageable in slots 51; and in this instance the outermost ends of the actuator arms underlie abutments 52 mounted on the brake shoes 24 immediately beneath the lowermost sets of mounting ears 27. The sleeve 49 is axially movable along the column 37 and is normally biased toward a lowermost position by means of the springs 53 which extend between the bracket 48 and the lowermost ends of the side members 14, 15. Thus, the springs tend to bias the actuator arms 47 to the operative position seen in FIGURES 7 and 10 wherein the outermost ends of the arms have contacted the abutments 52 and pivoted the brake shoes 24 upwardly into engagement with the column 10.

Figure 7:
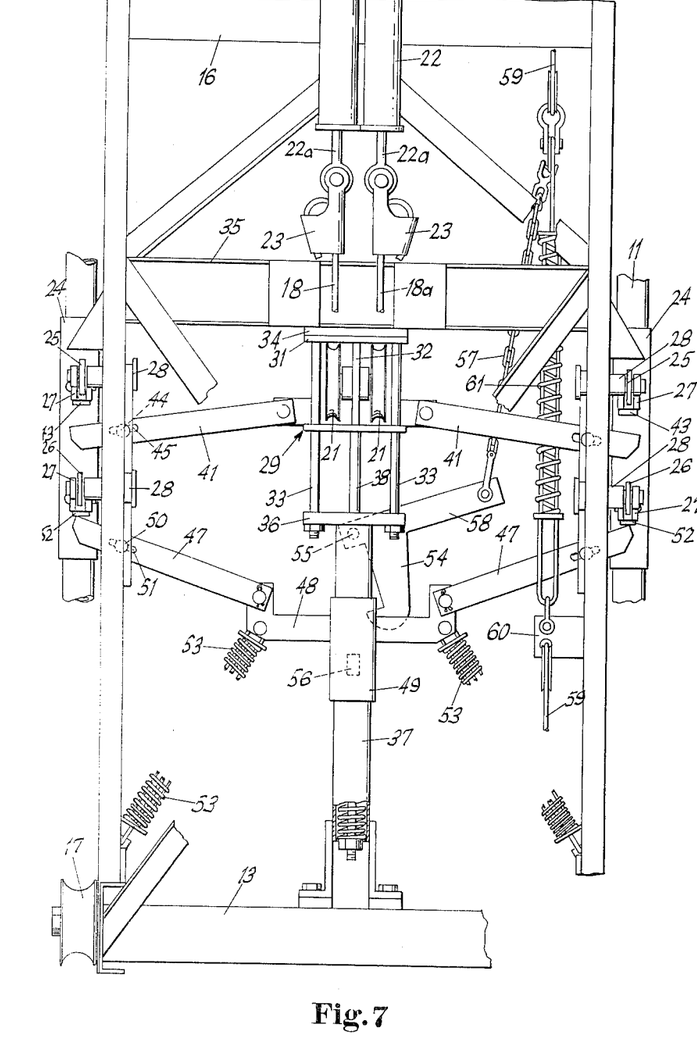
FIGURE 7 is an enlarged fragmentary elevational view illustrating the actuation of another of the safety devices.

The arms 47 are actuated by means of the latch member 54 pivoted at 55 to the column 37, the latch normally engaging a lug 56 projecting outwardly from the sleeve 49.

The latch is released by means of a chain 57 connected at its lowermost end to a rearwardly projecting arm 58 forming a part of the latch, and connected at its opposite end to the overspeed cable 59. The cable 59 is connected at its opposite ends to the bracket 60 fixedly secured to the frame member 14 of the cab frame. Preferably, the upwardly projecting portion of the cable will be secured to the bracket by means of a spring member 61 which acts to resiliently secure the cable to the cab and hence protect against undue shock.

The manner in which the cable is arranged can be best seen by again referring to FIGURE 4 wherein it will be seen that the cable 59 passes upwardly over the crown assembly 12 at the top of the tower where it passes around a cable speed governor 62—which will be described in greater detail hereinafter—and then downwardly along the tower to the main frame 1, around the sheave 63 and thence upwardly to the bracket 60 where the opposite end of the cable is also secured. Thus, the cable 59 forms a continuous loop the meeting ends of which are secured to the cab frame. As the cab moves up and down along the tower, the overspeed cable will move with it, the cable passing around the cable speed governor 62 and sheave 63 as it moves.

Figure 11:
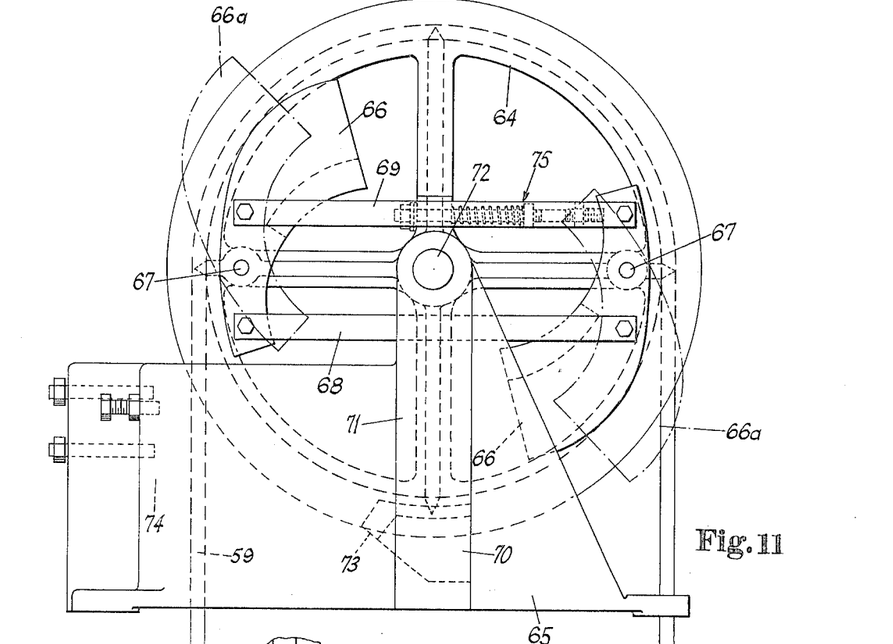
FIGURE 11 is an enlarged side elevational view illustrating the cable speed governor.

Referring now to FIGURE 11, which shows details of the cable speed governor 62, it will be seen that the cable 59 passes around a grooved wheel 64 rotatably journaled in a frame 65 forming a part of the crown assembly 12. The governor—which is a commercially available unit—is provided with a pair of centrifugal arms 66 pivoted to the wheel 64 at pivot points 67. The arms are linked together by means of a parallel linkage composed of link members 68 and 69 lying on opposite sides of the pivot points 67. As the wheel 64 is rotated by the cable 59, the arm members 66 will normally occupy their innermost position; but should an excessive speed of rotation be achieved—as where the speed of travel of the cable is increased—centrifugal force will act to project the arm 66 outwardly to the position indicated at 66a. When in the extended position, one of the arms will be brought into contact with an abutment 70 forming a part of a yoke-like member 71 pivotally secured to the axle 72 of the wheel 64, the member 71 being free to pivot relative to the wheel under the influence of one of the extended arms 66a. The member 71 is thus caused to rotate in a clockwise direction until its grooved face 73 contacts the cable 59 and forces it into clamping engagement with a stop member 74 mounted on the frame 65. This wedging action effectively clamps the cable against movement and, in so doing, effectively acts to trip the latch 54 and hence release the actuator arms 47 for movement to their operative position. That is, and with reference to FIGURE 7 of the drawings, if the elevator cab, as represented by the cab frame, is moving downwardly, the cable 59 is traveling with it. In the event that an excessive speed is attained, the cable speed governor 62 will act to arrest movement of the cable. The cab will, however, continue to move downwardly so that the spring 61 will be expanded. Such expanding movement will continue until the chain 57 is drawn taut, whereupon continued downward movement of the cab will effectively constitute the chain 57 a continuation of the cable 59 and the latch 54 will thereby be tripped. It will be understood, of course, that once the movement of the cable has been arrested by the cable speed governor, the cab will continue to move only a matter of a few inches before the chain 57 is drawn taut and the latch tripped. Referring again to FIGURE 11, it will be noted that the link member 69 is provided with adjustment means 75 by means of which the governor may be adjusted to become operative at any desired speed.

As should now be evident, the pair of brake shoes may be actuated to arrest movement of the cab either upon failure of the cables or upon excessive downwardly speed of the elevator cab.

Figure 13:
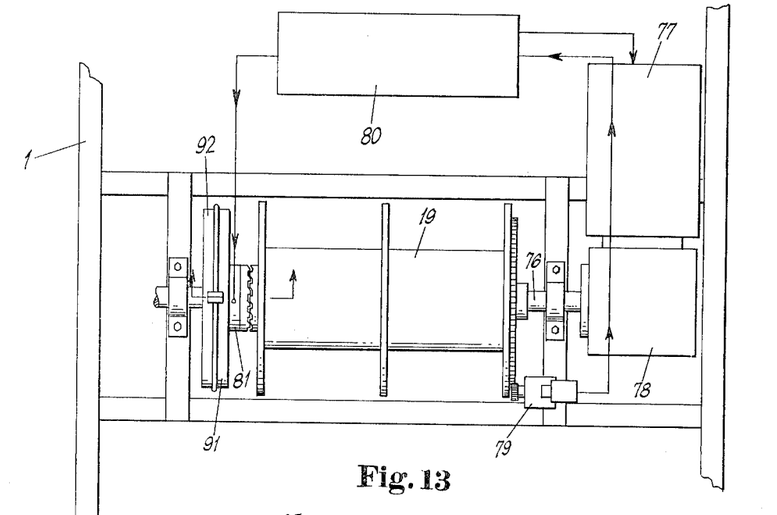
FIGURE 13 is a somewhat schematic elevational view of the cable winch and associated operating and control mechanism.

In addition to the dual acting safety device just described, further protection is provided in the event of motor failure or other failure which might render the cable winch free-running and hence permit the cab to fall. Normally, the power unit itself—usually an electric motor—is equipped with brake means which will stop and hold the motor drive shaft in the event of a power interruption. However, should such motor brake fail or should a failure occur in the drive mechaism interconnecting the motor and the cable winch, an overspeed winch brake is provided to stop and hold the elevator cab. Thus, with reference to FIGURE 13, the cable winch 19 is mounted on a shaft 76 operatively connected to motor 77 through a worm gear speed reducer indicated generally at 78. An overspeed governor 79 is operatively connected to the winch 19. The governor incorporates a speed-sensitive switch which will be actuated only if the winch speed exceeds its normal operating speed by a predetermined amount, such as twenty-five percent of its normal speed. When actuated, the governor acts through suitable circuitry in the control box 80 to operate brake control means 81 operatively connected to the opposite end of the winch and at the same time interrupt current to the drive motor 77.

Figure 12:
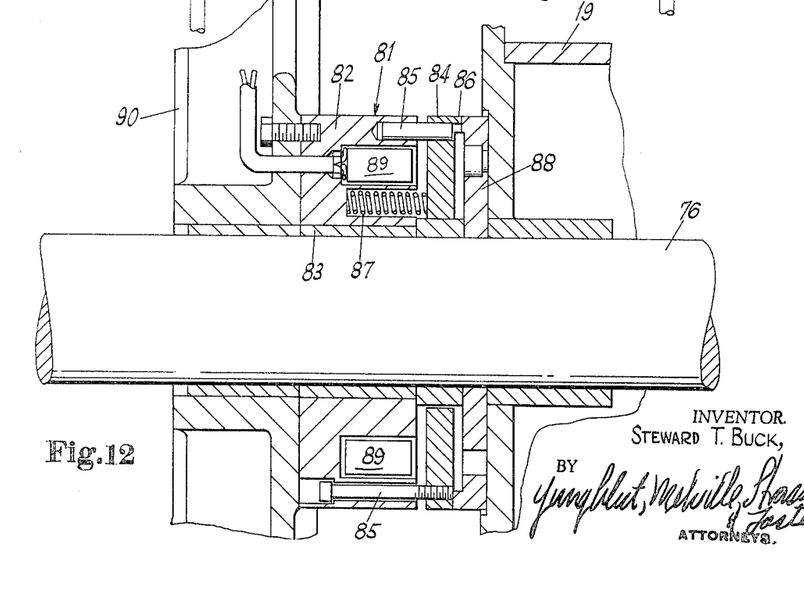
FIGURE 12 is an enlarged vertical sectional view taken along the line 12—12 of FIGURE 13.

Referring now to FIGURE 12, the brake control means 81 comprises a housing 82 rotatably journaled on the shaft 76 by means of bushing 83. An axially displaceable disc 84 is operatively connected to the housing 82 by means of pins 85; and the toothed face 86 of the disc is normally biased by spring means 87 into meshing engagement with a toothed plate 88 which is fixedly secured to the end face of the winch 19 for rotation therewith. Electromagnetic members 89 are mounted in housing 82 and arranged, when energized, to displace the disc 84 toward the housing 82, thereby disengaging the brake control means 81 from the winch 19.

Figure 14:
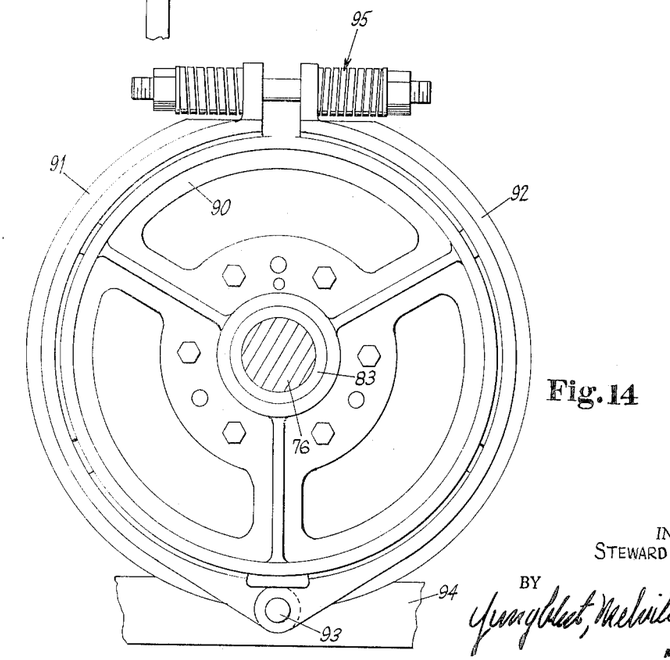
FIGURE 14 is an enlarged side elevational view of the winch brake.

A brake drum 90 is also journaled on the shaft 76 so as to be rotatable relative thereto; and this brake drum is fixedly secured to the housing 82 of the brake control means. Referring now to FIGURE 14, the brake drum 90 is adapted to be engaged by a pair of brake shoes 91, 92 pivotally connected at 93 to each other and to a fix support 94 comprising a part of the main frame of the device. The shoes are biased into clamping engagement with the drum by means of the tightening device indicated generally at 95. With this arrangement the brake shoes act at all times to hold the drum 90 against rotation. Thus, when the brake control means 81 is in the position illustrated in FIGURE 12, the winch will be locked against rotation by the engagement between the brake shoes 91, 92 and the brake drum 90. However, during the times when the hoisting device is in operation, the circuit to the electromagnets 89 will be energized and the disc 84 displaced so as to free the plate 86 and hence the winch 19 for rotation. But, as already pointed out, should the overspeed governor 79 be actuated by excessive winch speed, the circuit to the electromagnets 89 will be broken and the disc 84 released under the influence of springs 87 to thereby engage plate 86 and hence place winch 19 under the influence of the brake. It will be noted that the engaging action of the brake control means 81 is purely mechanical, and hence the device will operate to effectively lock the winch against rotation in the event of a power failure. It will be evident, however, that the device complements the function of the brake shoes 24 and actuator arms 47 in that it operates in the event of overspeeding of the cable winch which would permit the elevator cab to drop.

Figures 15, 16:
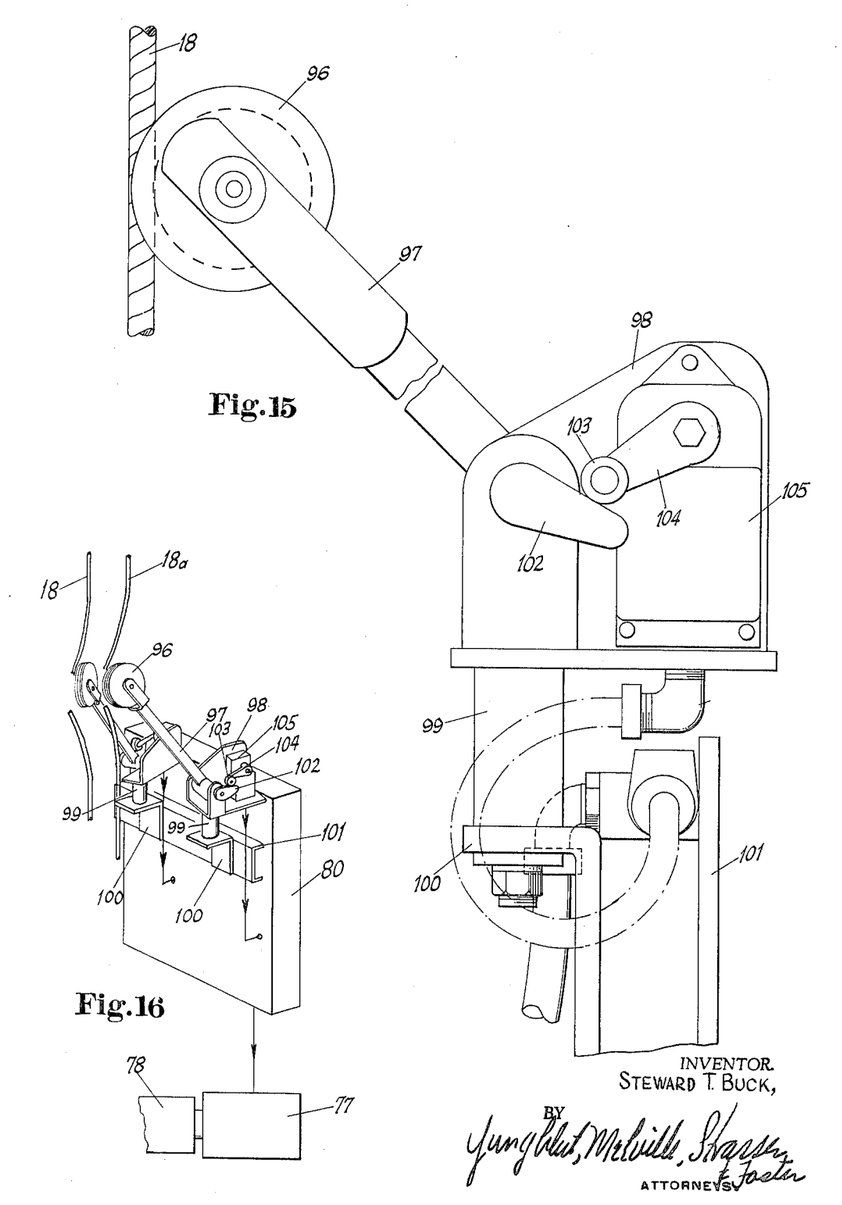
FIGURE 15 is an enlarged side elevational view of one of the slack cable detecting devices.
FIGURE 16 is a perspective view illustrating the mounting and operation of the slack cable devices.

Additional means are also provided in the event a slack or broken cable is encountered. Thus, as seen in FIGURES 15 and 16, each of the cables 18, 18a is contacted by a grooved wheel 96 mounted on an arm 97 pivotally connected to a bracket 98 which in turn is pivotally secured, as at 99, to a support 100 mounted on a cross brace 101 forming a part of the tower structure. Each of the arms 97 is operatively connected to a finger 102 which contacts the follower 103 of an arm 104 forming a part of limit switch 105. The limit switch 105 is operatively connected through control box 80 motor 77.

In normal operation the grooved wheels 96 ride in contact with the taut cables 18, 18a so that the arms 97 maintain the fingers 102 in a depressed position. Should either or both of the cables become slack or break, the arms 97 will be free to fall and in so doing the fingers 102 move upwardly, thereby actuating the switches 105 which in turn interrupt the power to the drive motor 77 and hence stop the winch. Having once been activated, either or both devices will continue to render the drive motor inoperative until such time that the cables are made taut or the switches 105 reset and the grooved wheels 96 replaced on the cables. It will also be noted that the devices are free to pivot laterally so that they may follow the cables as they are wound onto or payed out from the winch.

As should now be evident, the several safety devices while independently operable nonetheless coact with each other to provide positive control over the operating components of the hoisting machine and hence assure the safety of personnel carried thereby irrespective of a malfunction in any one of the devices. Thus, should either of the cables become slack, the microswitches 105 will sense such condition and immediately stop the drive motor until the condition has been rectified. If the slack were to simultaneously effect both cables to the extent that the elevator cab would tend to fall, the initial drop of the cab would bring the cage 29 and actuator arms 41 into play, thereby setting the shoes 25 and locking the cab to the tower. If for any reason the cage mechanism 29 should fail to function, the continued downward movement of the cab would bring into play the cable speed governor 62 which will actuate the shoes 25 through the actuator arms 47. If, instead of slack or broken cables, the winch should overspeed, the winch overspeed governor 79 would serve to actuate the brake control means 81, thereby positively locking the winch against rotation and at the same time shutting off power to the drive motor. This failing to halt the downward movement of the cab, the cable speed governor 62 would again come into play to actuate the cab locking shoes 24.

Modifications may be made in the invention without departing from its spirit and purpose. Having, however, disclosed the invention in an exemplary embodiment, what it is desired to secure and protect by Letters Patent is:

1. In a hoisting machine having a pair of laterally spaced vertical tracks, a cab supporting frame including a pair of side frame members mounting guide means in engagement with said tracks, cable means operatively connected to said cab frame for raising and lowering said cab frame along said tracks, an elongated brake shoe pivotally connected to each of said side frame members, said brake shoes being movable from an inoperative position in which they are out of contact with said tracks to an operative position in which said shoes are in wedged engagement with said tracks, spring loaded actuator means for moving said brake shoes from the inoperative to the operative position, latch means normally biasing said actuator means to an inoperatively position, and means for releasing said latch means, said release means being responsive to a predetermined excessive downward speed of said cab frame, whereby said spring loaded actuator means will be released to move said brake shoes to their operative position upon downward movement of said cab frame at an excessive rate of speed, a second spring loaded actuator means for moving said brake shoes from the inoperative to the operative position, and means operatively connected to the cable means for biasing said second actuator means to the inoperative position, whereby said second actuator means will be released to actuate said brake shoes in the event said cable means fails and releases said cab frame for falling movement.

2. The hoisting machine claimed in claim 1 wherein said cable means includes a cable wound on a winch, wherein said winch is operatively connected to a prime mover, such as an electric motor, and wherein a slack cable detector is in engagement with said cable, said detector including switch means operative in the event said cable should break or become slack to deenergize said prime mover.

3. The hoisting machine claimed in claim 2 including a normally set brake means mounted adjacent said winch, electromagnetic clutch means operative, when deenergized, to connect said winch to said brake means, an overspeed governor operatively connected to said winch, said overspeed governor including switch means operative, when the speed of rotation of said winch exceeds a predetermined limit, to deenergize said magnetic clutch means and connect said winch to said brake means.

4. In a hoisting machine having a pair of laterally spaced vertical tracks, a cab supporting frame including a pair of side frame members mounting guide means in engagement with said tracks, cable means operatively connected to said cab frame for raising and lowering said cab frame along said tracks, an elongated brake shoe pivotally connected to each of said side frame members, said brake shoes being movable from an inoperative position in which they are out of contact with said tracks to an operative position in which said shoes are in wedged engagement with said tracks, spring loaded actuator means for moving said brake shoes from the inoperative to the operative position, said actuator means comprising a pair of actuator arms pivotally connected adjacent their outermost ends to said side frame members and pivotally connected at their innermost ends to a vertically movable bracket, spring means extending between said bracket and said cab frame and acting to bias said actuator arms into brake shoe engaging position in which said arms urge said brake shoes into wedging engagement with said tracks, latch means positioned to engage and hold said bracket in a position such that said actuator arms are inoperative, means responsive to a predetermined excessive downward speed of said cab frame connected to said latch means and operative to disengage said latch means and thereby release said bracket and the actuator arms connected thereto for movement to brake shoe engaging position, a second spring loaded actuator means for moving said brake shoes from the inoperative to the operative position, and means operatively connected to said cable means for biasing said second actuator means to the inoperative position, whereby said second actuator means will be released to actuate said brake shoes in the event said cable means fails and releases said cab frame for falling movement.

5. The hoisting machine claimed in claim 4 wherein said second actuator means comprises a second pair of actuator arms pivotally connected adjacent their outermost ends to said side frame members, and wherein the means operatively connected to said cable means for biasing said second actuator means to the inoperative position comprises a vertically movable cage to which the inner ends of said second pair of actuator arms are pivotally secured, and spring means operatively connected to said cage for biasing said second set of actuator arms to the operative position.

References Cited by the Examiner
UNITED STATES PATENTS

| | | | |
|---|---|---|---|
| 1,145,250 | 7/1915 | Matava | 187—79 |
| 1,171,243 | 6/1916 | Prokop | 187—84 |
| 1,819,502 | 8/1931 | Dunlop | 187—91 |
| 2,511,697 | 6/1950 | Clift | 187—90 |
| 2,945,561 | 7/1960 | Moyer | 187—81 |
| 2,990,034 | 6/1961 | Buck | 187—80 |

SAMUEL F. COLEMAN, *Primary Examiner.*

ANDRES H. NIELSEN, *Examiner.*